United States Patent [19]

Katbi et al.

[11] Patent Number: 5,222,843
[45] Date of Patent: Jun. 29, 1993

[54] INSERT FOR LIGHT FEED, LIGHT DEPTH OF CUT

[75] Inventors: Karl Katbi, Troy; Thomas J. Bernadic, Madison Heights; Tony M. Lowe, Royal Oak; John H. Patterson, Hazel Park, all of Mich.

[73] Assignee: Valenite Inc., Troy, Mich.

[21] Appl. No.: 902,331

[22] Filed: Jun. 22, 1992

[51] Int. Cl.⁵ .............................................. B23B 27/22
[52] U.S. Cl. .................................... 407/114; 407/116
[58] Field of Search ................... 407/113, 114–116

[56] References Cited

U.S. PATENT DOCUMENTS

| 3,792,515 | 2/1974 | Lundgren | 407/113 X |
| 3,866,282 | 2/1975 | Lundgren | 407/113 X |
| 4,189,265 | 2/1980 | Arnold et al. | 407/114 |
| 4,411,565 | 10/1983 | Hazra et al. | 407/114 |

Primary Examiner—Steven C. Bishop
Attorney, Agent, or Firm—Bill C. Panagos

[57] ABSTRACT

A polygonal, lay down indexable cutting insert for eight feed and light depth of cut application. The insert has intermittent seating pads, chipbreaker pads, and stabilizer pads and is configured to allow coolant to be circulated across the body of the insert during cutting operations.

11 Claims, 2 Drawing Sheets

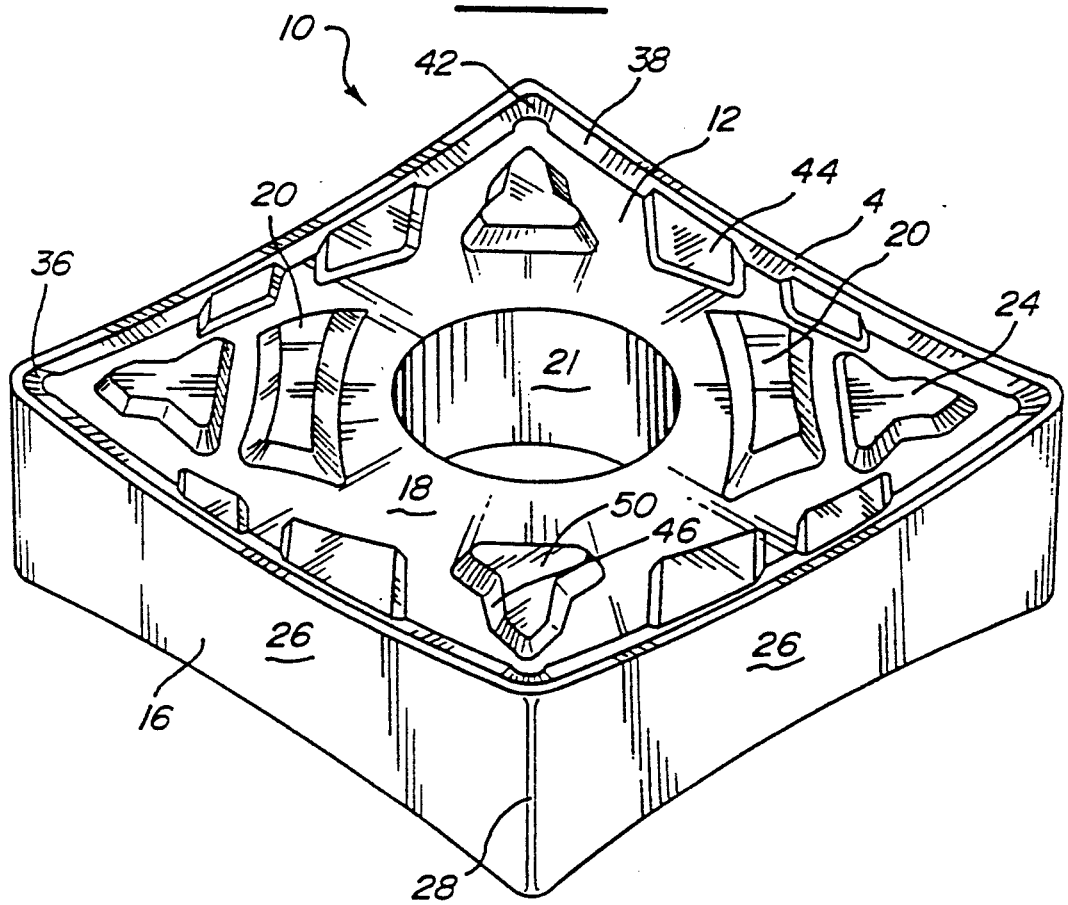
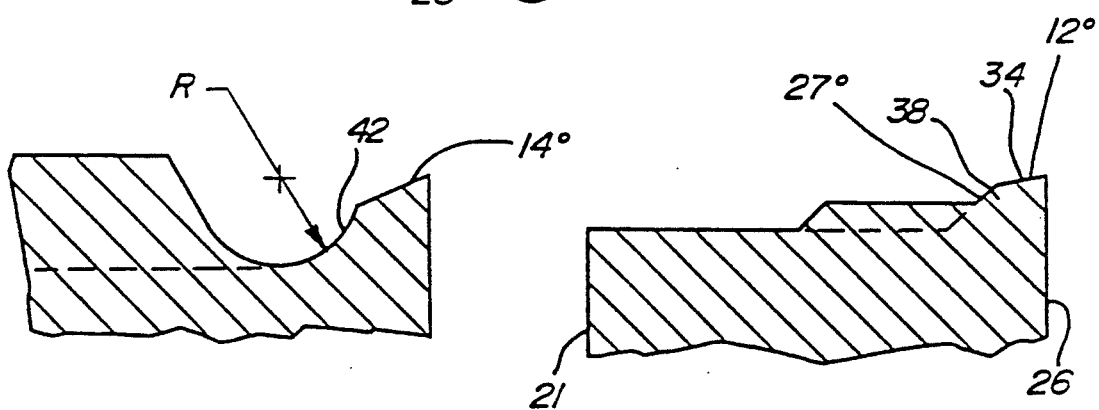

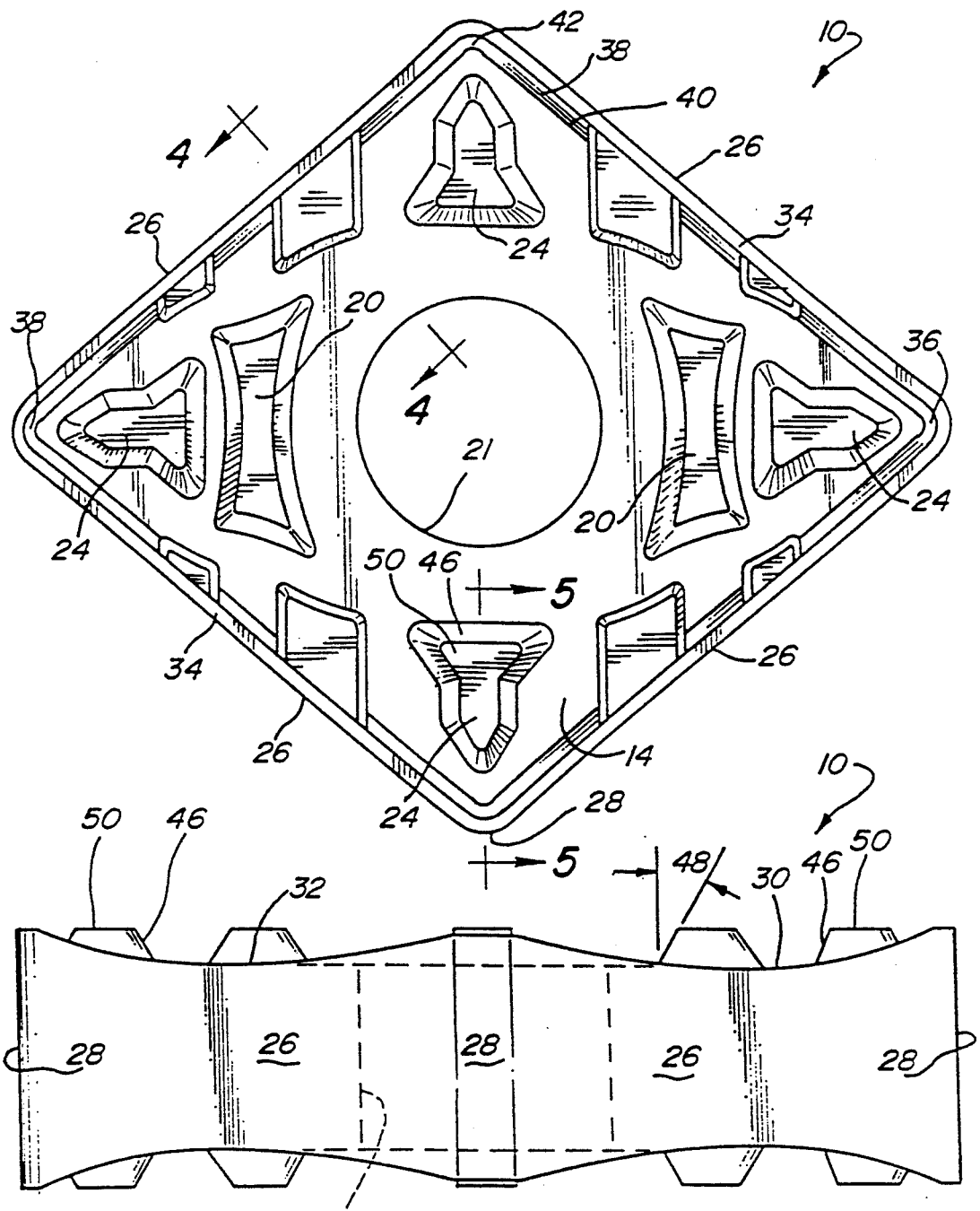

INSERT FOR LIGHT FEED, LIGHT DEPTH OF CUT

BACKGROUND OF THE INVENTION

The present invention relates to a cutting insert for light feed and light depth of cut applications for turning ductile material such as steel.

The present invention further relates to an insert for light feed and light depth of cut having variable land angles, including a first and second variable land angles with a plurality of support pads along the cutting edge which are useful for providing for profiling and backfeed facing applications.

The present invention also relates to an insert for light feed and depth of cut in boring applications.

SUMMARY OF THE INVENTION

The present invention relates to a polygonal lay down indexable cutting insert for light feed and depth of cut applications. The insert has a top surface, a bottom surface and a sidewall extending substantially unbroken therebetween to define a body. The top surface has a plurality of raised islands, which act as seating pads, disbursed about a centrally located hole in the top surface and extending through the body of the insert. Chipbreaking pads are located in each corner of the insert and are useful in chip control and chip direction. The bottom surface is substantially parallel to the top surface and has a plurality of islands and chipbreaker pads of the same configuration and location as the islands and chipbreaker pads on the top surface. The sidewall is comprised of a plurality of component side flanks which extend from corner to corner of the insert. The component side flanks descend from each corner of the insert toward the mid-point of each component side flank in a concave or descending arcuate manner. A cutting edge is formed along the arcuate surface at the meeting of each component side flank and the top and bottom surfaces. A variable width land surface extends rearwardly from the cutting edge. The variable width land surface is of narrower width at the corners of the insert than along the flanks of the insert and is radiused at the corners of the insert. The variable width land surface has a first variable descending angles which is greater at each corner of the insert than along the side flanks of the insert. A second descending land angle surface is adjacent to and rearward of the first variable land angle surface. The second descending land angle surface is planar along the flanks of the insert and radiused at each corner of the insert. Various stabilizer pads are located intermittently along the cutting edge and adjacent to the first variable descending land surface along each component side flank of the insert.

BRIEF DESCRIPTION OF THE DRAWINGS

FIG. 1 is a top perspective view of the polygonal lay down indexable cutting insert.

FIG. 2 is a top plan view of the polygonal lay down indexable cutting insert.

FIG. 3 is an on-side view of the polygonal lay down indexable cutting insert showing the descending arcuate cutting surfaces.

FIG. 4 is a sectional view of the polygonal lay down indexable cutting insert along line 4—4 of FIG. 2.

FIG. 5 is a cross-sectional view of the polygonal lay down indexable cutting insert along line 5—5 of FIG. 2.

DETAILED DESCRIPTION OF THE PREFERRED EMBODIMENT

Turning now to the drawings wherein like numerals reference like structures, and particularly to FIGS. 1, 2 and 3, polygonal lay-down indexable cutting insert 10 is comprised of a top surface 12 and bottom surface 14 and sidewall surface 16 which extends substantially unbroken there between to define a body 18 of the insert. The insert is further equipped with a central hole 21 which extends through the body of the insert. The top and bottom surface of the insert are generally planar and are substantially parallel to each other and are equipped with raised island seating pads 20 located on the top and bottom surface of the insert and located opposite each other and separated from each other by the centrally located hole 21. In the corners 28 of the insert, raised chipbreaker pads 24 are disposed. The chipbreaker pads aid in the direction of the chip and break the chip into manageable sizes so that they do not interfere with the insert during cutting. The sidewall is comprised of the component side flanks 26 which are defined as that portion of the sidewall which extends from one corner to another corner of the insert. The insert cutting edge descends from the corners toward the mid-point 32 of the flank in a concave or descending arcuate cutting edge 30. It is preferred that the descending arcuate cutter edge descend from about 0.010 to 012 inches from the corners of the insert to the mid-point of the flank. The descending arcuate cutting edge lowers the cutting force and aids in chip control. The descending arcuate cutting edge is formed at the meeting of each component side flank at the top and bottom surfaces. Rearward of the cutting edge is a variable width land surface 38. The first variable width land surface is of narrower width at the corners of the inserts than at the flanks of the insert and is radiused at the corners of the insert. Along the flanks of each insert, the first variable width land angle surface has a width of 0.012 whereas along the flanks, it has a width of approximately 0.010 inches at each corner.

The first variable width land angle surface has a first variable descending land angle which is a positive rake angle. The first variable descending land angle is greater at each corner of the insert than along the flanks. Indeed, in the present invention, it can be seen that the descending angle at the corners of the inserts is 14 degrees whereas the descending angle along the flanks of the insert is 12 degrees. Those skilled in the art will recognize that the nose and flanks may assume any descending angles, as long as the angle at the nose is greater than the flanks.

Along the flanks of the insert is a second descending land angle surface which is adjacent to and rearward of the first variable land angle surface. The second descending land angle surface is planar along the flanks of the insert and is radiused at each corner of each insert. In this regard, as seen in FIG. 5, it is contemplated that along the flanks of the insert, the second descending land angle is approximately 27 degrees, whereas in the corners of the insert, the second descending land angle surface is radiused at a radius of 0.010. Returning to FIGS. 1-3, various stabilizer pads 44 are located intermittently along the cutting edge and about the second variable land surface along each component side flank of the insert. The stabilizer pads as seen in FIG. 4, are adjacent the first variable descending angle surface, and abut the secondary descending land angle.

The seating pads, chipbreaker pads, and stabilizer pads are all raised from the top o bottom surface and have all ascending surface 46, which is inclined at same angle 48, which may or may not be the same for the seating pads, chipbreaker pads, and/or stabilizer pads. It is preferred that they all rise at a 35° angle. The seating pads are preferably raised higher from the top and bottom surface and function as a seating surface for the insert. Indeed, the seating pads are preferably raised 0.012 from the top surface and the chipbreaker pads are raised 0.010 from the top surface and the stabilizer pads are raised 0.002 to 0.005 inches from the top surface. In this regard, surface 50 of the seating pad is planar and adapted to be seated in a tool holder pocket.

The chipbreaker pads are designed such that they are shaped roughly as an inverted "T". It is contemplated that the cross bar of the inverted "T" be oriented toward the central hole, whereas the vertical portion of the "T" be oriented toward the corners of the insert.

The islands, chipbreakers and stabilizer pads are configured as they are in order to allow coolant to be directed across the top and bottom surface during cutting operations to keep the insert cool and extend tool life.

The polygonal lay down indexable cutting insert described herein is adapted to have a feed rate of about 0.006 to 0.016 IPR and a depth of cut of from about 0.010 to 0.125 inches.

Various modifications will become apparent to those skilled in the art without departing from the scope and spirit of the invention.

We claim:

1. A polygonal lay down indexable cutting insert for light feed and light depth of cut applications, comprising:

a top surface, a bottom surface and a sidewall extending substantially unbroken therebetween to define a body, said top surface having a plurality of raised islands which act as seating pads dispersed about a centrally located hole in the top surface and extending through the body of the insert, and chip breaking pads located at each corner of the insert; said bottom surface substantially parallel to said top surface and having a plurality of islands and chip breaking pads of the same configuration and location as said islands and chipbreaker pads of the top surface; said side wall comprised of a plurality of component side flanks which extend from corner to corner of the insert, said component side flanks descending arcuately from each corner of the insert toward the midpoint of each component side flank; a cutting edge formed at the meeting of each component side flank and the top and bottom surfaces; a variable width land surface extending rearwardly from said cutting edge; said variable width land surface of narrower width at the corners than at the flanks of the insert and radiused at the corners of the insert; said variable width land surface having a first variable descending land angle; said first variable descending land angle being greater at each corner of the insert than along the side flanks; a second descending land angle surface adjacent to and rearward of said first variable land angle surface, said second descending land angle surface being planar along the flanks of the insert and radiused at each corner of the insert; and stabilizer pads located intermittently along the cutting edge and adjacent to said first variable descending land surface along each component side flank of the insert.

2. The polygonal lay down indexable cutting insert of claim 1, wherein said first variable descending land angle is 12° along the flank of the insert and 14° at the corners of the insert.

3. The polygonal lay down indexable cutting insert of claim 1, wherein said second variable descending land angle is 27° along the flanks of the insert and radiused 0.010 inches at the corners of the insert.

4. The polygonal lay down indexable cutting insert of claim 1, wherein the cutting edge descends from each corner of the insert toward the midpoint of each flank from about 0.010 to 0.012 inches.

5. The polygonal lay down indexable cutting insert of claim wherein said feed rate is about 0.006 to 0.016 IPR and said depth of cut is 0.010 to 0.125 inches.

6. The polygonal lay down indexable cutting insert of claim 1, wherein said variable width land surface is radiused at the corners of the insert and has a width of 0.010 inches at each corner of the insert and 0.012 inches along the flank of the insert.

7. The polygonal lay down indexable cutting insert of claim 1, wherein said first variable descending angle is a positive rake angle.

8. The polygonal lay down indexable cutting insert of claim 1, wherein there are two stabilizer pads along each cutting edge.

9. The polygonal lay down indexable cutting insert of claim 1, wherein said seating pads are opposite each other and separated from each other by said centrally located hole.

10. The polygonal lay down indexable cutting insert of claim 1, wherein said seating pads are raised 0.012 inches from the top surface of the insert and said chipbreaker pads are raised 0.010 inches from the top surface and said stabilizer pads are raised 0.002 to 0.005 inches from the top surface.

11. The polygonal lay down indexable cutting insert of claim 1, wherein said seating pads, chipbreaker pads, and stabilizer pads have an ascending angle surface inclined at about 35°.

* * * * *